United States Patent
Liesen

(10) Patent No.: US 7,555,612 B2
(45) Date of Patent: Jun. 30, 2009

(54) ADAPTIVE CONTROL OF LOADING A PROGRAM IN A DISK-BASED OPERATING SYSTEM

(75) Inventor: Christopher D. Liesen, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 592 days.

(21) Appl. No.: 10/930,286

(22) Filed: Aug. 31, 2004

(65) Prior Publication Data
US 2006/0059493 A1    Mar. 16, 2006

(51) Int. Cl.
*G06F 13/18*    (2006.01)
(52) U.S. Cl. ...................................... 711/151; 711/111
(58) Field of Classification Search ................. 718/105; 713/1, 2; 711/4, 111, 151
See application file for complete search history.

(56) References Cited

U.S. PATENT DOCUMENTS

2006/0048143 A1* 3/2006 Chao et al. ................... 717/177

OTHER PUBLICATIONS

The Microsoft Computer Dictionary, 5th ed., © 2002 Micrtosoft Corporation, p. 442.*

* cited by examiner

*Primary Examiner*—Reginald G Bragdon
*Assistant Examiner*—Kenneth M Lo

(57) ABSTRACT

An exemplary method controls the loading of a program in a computer system using a disk based operating system instead of allowing a built-in loading program resident in the operating system to handle the loading. The method separates the loading of the program into a series of modules that are loaded from a disk into random access memory where each module has a predefined target time interval within which the loading of the module is to be completed. The computer system is released to process other tasks following completion of the loading of one module and before the start of loading of a following module so that disruptions to the processing of the other tasks running on the computer system are minimized.

19 Claims, 4 Drawing Sheets

ADAPTIVE CONTROL OF LOADING A PROGRAM IN A DISK-BASED OPERATING SYSTEM

BACKGROUND

This invention generally relates to computer systems using disk based computer operating systems and more specifically addresses the loading of a program stored on a disk into memory of a computer system.

Several different disk based operating systems are in use in computer systems. For example, Microsoft Windows XP and UNIX are disk based operating systems that are utilized in a large number of computer systems. Other disk based operating systems are in use or have been utilized in computer systems that are no longer being produced.

FIG. 1 illustrates an exemplary computer system 10 that includes a computer 12 that is supported by peripherals such as monitor 14 and keyboard 16. Computer 12 is also linked to external network 18 such as by known communication protocols, e.g. Ethernet or a form of Internet Protocol. The computer 12 includes one or more microprocessors 20 that are supported by read-only memory (ROM) 22, random access memory (RAM) 24, and hard disk 26. This computer 12 can be used in a configuration where hard disk 26 does not exist and is replaced by disk 25 accessed via external network 18 with the assistance of a remote server or computer 27. An input/output (I/O) interface 28 supports communications between the microprocessor 20 and the external environment. The ROM 22 contains nonvolatile instructions such as are commonly read during the initial boot startup of the microprocessor 20. The RAM 24 supports various operational code and data utilized by the microprocessor 20 during the execution of a plurality of programs and tasks. Hard drive 26 provides nonvolatile storage of various programs and data, and typically provides for a substantial amount of storage that commonly exceeds the storage capacity of RAM 24. During the initial boot startup, basic instructions are typically fetched from ROM 22 and the hard disk that enables the processor 20 to load programs and data stored in the hard disk 26 into RAM 24 from which such programs are executed by the microprocessor 20.

FIG. 2 is an exemplary flow diagram illustrating how a microprocessor utilizing a UNIX disk based operating system typically processes requests for service, e.g. a request to load a program stored on the hard disk. In step 30 the microprocessor receives a request for service that may be initiated by a system call or an interrupt. A determination is made in step 32 of whether the request requires real-time processing. A NO determination by step 32 results in the request being granted a quantum of time (or time equivalents such as a predetermined number of cycles) to proceed with a task associated with the request in step 34. In step 36 a determination is made of whether the quantum has elapsed or the task has completed. A NO determination by step 36 results in processing returning to the beginning of step 36. A YES determination by step 36 results in the termination of the current processing at step 38. In step 40 the microprocessor is released to go to the next request. If the YES determination in step 36 was caused by the task having been completed, then the associated request for service is satisfied and no further processing requests associated with this completed task are required and hence no additional or supplemental requests will be put in a queue to cause additional processing by the microprocessor. If the YES determination step 36 was caused by the quantum time having elapsed, then the task associated with the request has not been completed and a supplemental request will be put in a queue to be acted upon by the microprocessor when the supplemental request is reached by the microprocessor. This permits a task requiring longer than the quantum time to be completed in a time multiplexed manner along with other tasks and operations required to be performed by the microprocessor.

A YES determination by step 32 indicates that real-time processing of the associated task is required. In accordance with real-time processing requirements, the processing of the real-time task is started as indicated in step 42. In step 44 a determination is made of whether the task is completed. A NO determination by step 44 results in processing continuing to the beginning of the step, i.e. the processing of the task continues. A YES determination by step 44 indicates that the task has been completed and the microprocessor is released from the processing of this task as indicated by step 40. Since the microprocessor continues to process a real-time process request until it is completed, this means that the processing of other requests and tasks by the microprocessor is deferred for the time interval required to conclude the processing of the currently running real-time task.

The processing of some real-time tasks in the disk based operating system computer environment explained with regard to FIG. 2 can present difficulties especially where other time critical requests or tasks are waiting to be started or for further processing. For example, a real-time request to load a new program of a substantial size, e.g. 10 Megabytes, from the disk operating system may require a substantial amount of processing time, e.g. several seconds. Since other programs and tasks will not be able to obtain processing from the microprocessor during this time, some waiting programs or tasks may result in a fault or failure due to a time critical need for processing that was not met. Thus, there exists a need to prevent tasks from excessively monopolizing the processing capability of the microprocessor to the detriment of other tasks, especially but not limited to, loading a program from a hard drive into RAM memory.

SUMMARY

It is an object of the present invention to minimize difficulties associated with this problem.

An exemplary method controls the loading of a program in a computer system using a disk based operating system instead of allowing a built-in loading program resident in the operating system to handle the loading. The method separates the loading of the program into a series of modules that are loaded from a disk into random access memory where each module has a predefined target time interval within which the loading of the module is to be completed. The computer system is released to process other tasks following completion of the loading of one module and before the start of loading of a following module so that disruptions to the processing of the other tasks running on the computer system are minimized.

An exemplary computer system and an article including one or more computer-readable signal-bearing media are also presented.

DETAILED DESCRIPTION

The exemplary embodiment of the present invention will be described for use on a computing system with a disk based UNIX operating system such as available from Hewlett-Packard and Solaris. However, it will be understood that other computing systems with disk based operating systems that have similar needs can also benefit. This embodiment is especially, but not exclusively, adapted for controlling the loading of an executable program stored on the hard disk into memory where the operating system, without the benefit of the present embodiment, would normally cause the entire program to be loaded in one continuous, uninterrupted, processing task by the microprocessor. In accordance with the embodiment of the present invention, an executable program that requires longer than a predetermined time to be loaded from a hard disk into memory is automatically loaded as time separated modules so that the microprocessor can attend to other tasks between the loading of the modules. As the modules are loaded, the number of pages loaded into memory is preferably automatically adjusted to maximize the number of pages that can be loaded during the targeted time allotted for loading of each module.

Figure 3:
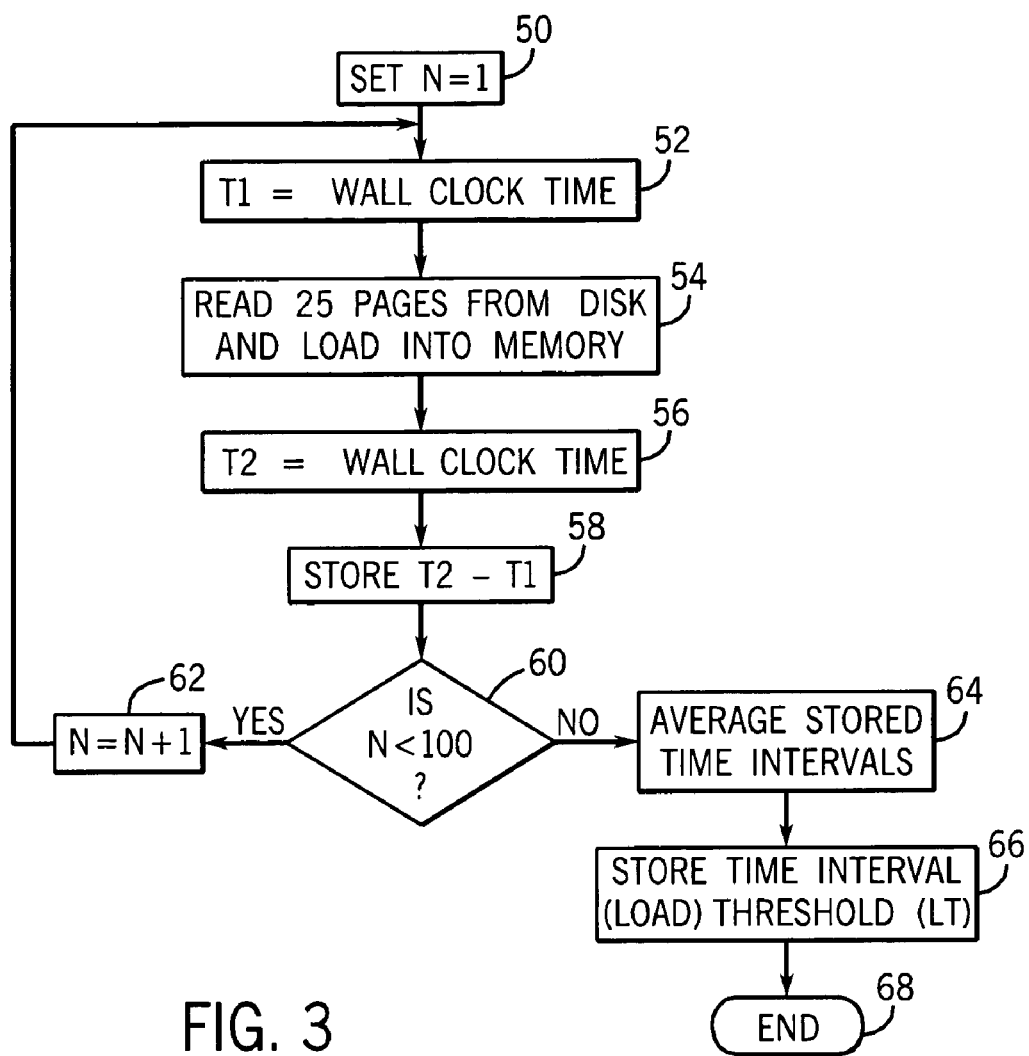
FIG. 3 is a flow diagram of an exemplary method for determining a threshold time in accordance with an embodiment of the present invention.

FIG. 3 is a flow diagram of steps in an exemplary method in accordance with the present invention for determining a target time interval (loading threshold—LT) that will be allocated to the loading of each module of the program to be loaded. The steps in FIG. 3 are preferably executed from a call placed in the computer system startup scripts at a point where the computer system executes only 1 task at a time (single user mode) prior to entering a mode where a plurality of tasks are executed (multi-user mode). In step 50 variable N is set equal to 1. In step 52 a wall clock time is measured and stored as T1. As used herein a "wall clock time" refers to a time measured on a running chronological clock that is preferably of high accuracy. The time may be represented as a conventional time measurement based on hours, minutes, seconds, etc. or maybe represented by a number representative of an instant of time. In step 54 the microprocessor causes 25 pages to be read from the disk drive via an application page fault, loaded and locked into RAM memory. In the illustrative example, work is denominated in terms of pages, where a typical page size might be 8192 or 65536 bytes. Information is read and loaded on a page basis. Causing a page to be read into memory from disk for purposes of this embodiment is hereafter referred to as application page faulting. It is only necessary to request the operating system to read one byte at a memory address contained within the page. This read causes a page fault (a default operating system action where the operating system transfers all bytes contained in the page from the disk into memory) of the entire page into memory. The operating system uses the memory map established for the executing instance of the executable program to understand the location of the bytes on disk vis-à-vis the location of the bytes in memory. As used herein to "lock" a page in memory means to prevent information loaded into the page from being swapped from memory back to the hard disk. In step 56 the wall clock time is again measured and stored as T2. In step 58 the elapsed time between T2 and T1 is stored in memory. This elapsed time represents the cumulative time required to access, load and lock 25 pages into RAM memory from the hard disk. If the information to be loaded into RAM memory in a local computing system is resident on a hard drive or other data storage device located in an external network, delays in the communication links between the computing system and the data storage device in the external network is included in the measured elapsed time.

In step 60 a determination is made of whether N is less than 100. A YES determination by step 60 results in step 62 incrementing N, i.e. N=N+1. Control then returns to the input of step 52 where another elapsed time measurement will be made. A NO determination by step 60 represents that 100 such elapsed time measurements have been made and results in step 64 averaging the stored elapsed time measurements resulting in the calculation of an average elapsed time. This average elapsed time is preferably multiplied by 1.5 or some other linear scalar. (This elapsed time is preferably calculated when the computer system is running only one task. When the computer system is later running a plurality of tasks, some additional overhead must be planned into the threshold). In step 66 a load threshold (LT) time interval is stored and is based on the average elapsed time multiplied by the linear scalar. Depending upon the specific application and computing environment, the LT time interval that is selected should be an acceptable, uninterruptible processing interval. The actual LT time interval calculated via FIG. 3 is based on the average elapsed time, and factors in the speed of the subject microprocessor, memory latency, and disk latency. It will be understood that amounts of memory other than 25 pages and other than 100 elapsed time measurements can be utilized. The specific amount of memory to be fetched and the number of elapsed time measurements to be made can be advantageously selected to better reflect differing capabilities of various computer systems.

An alternative to the method described in FIG. 3 would be to manually select a time interval and manually store the selected time interval at a memory location or in a system accessible variable. However, such a manual derivation of a target time interval would not benefit from testing the actual system to be used and hence may not accurately account for time delays experienced by the computer system. System/program requirements that may specify maximum time intervals within which certain tasks must be completed may override the calculated LT value. The LT value is preferably not larger than 50% of such a required maximum time interval. In such a case, it may be desirable to manually select the interval.

Figure 4:
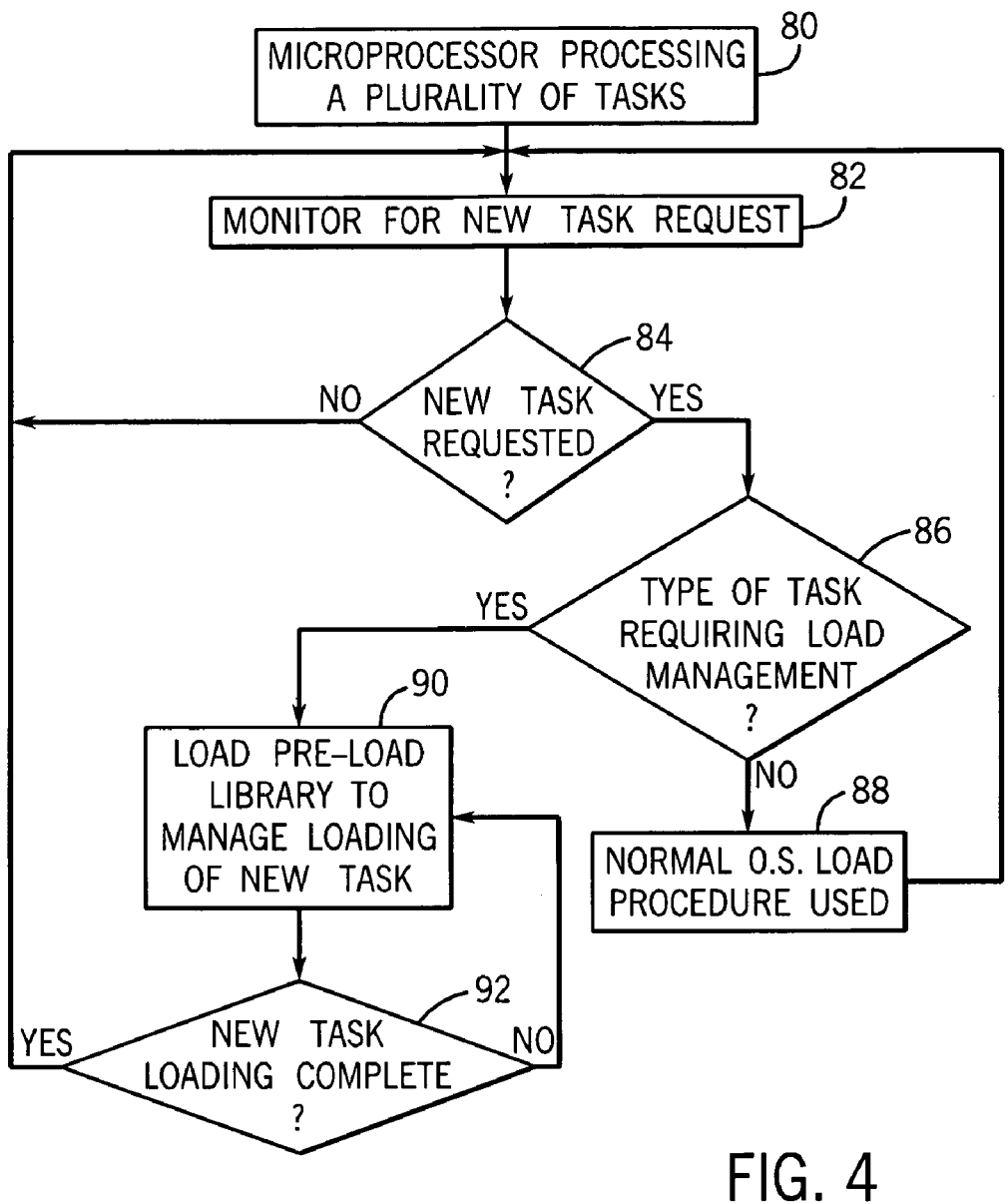
FIG. 4 is a flow diagram of another exemplary method in accordance with the present invention for controlling the time a microprocessor is occupied with carrying out a requested task.

FIG. 4 is a flow diagram of an exemplary method for controlling the time a microprocessor is occupied with carry out a requested task. The exemplary method effectively interposes a load control function ahead of the normal load control function embedded in the disk based operating system in order to more effectively control the loading of an executable program from hard disk into RAM memory as a series of modules. In the illustrative example the operating system is a disk based UNIX operating system which would, without the benefit of the exemplary embodiment, react to a request to load an executable program in a real-time environment by causing a continuous, uninterruptible loading of the executable program until the complete executable program was loaded.

Figure 1:
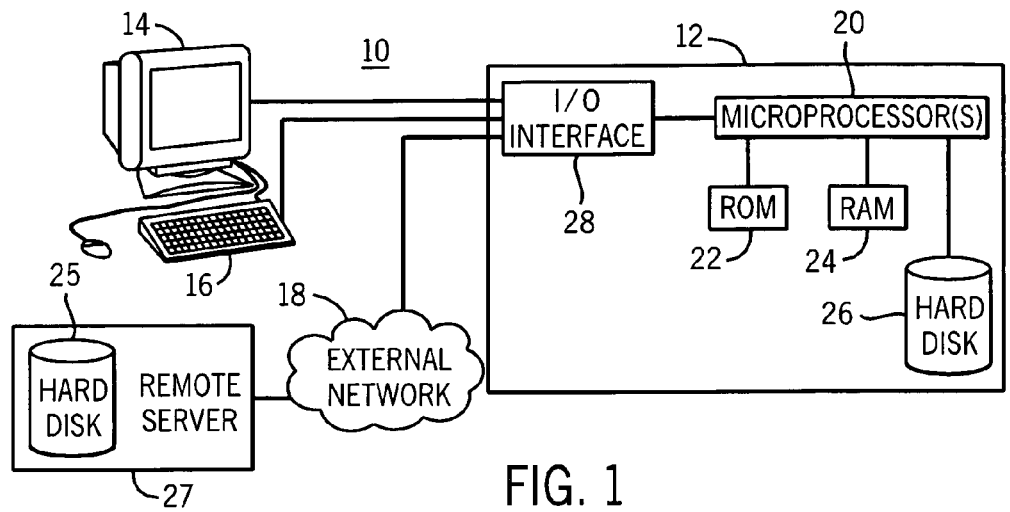
FIG. 1 illustrates an exemplary computer system known in the art.
Figure 2:
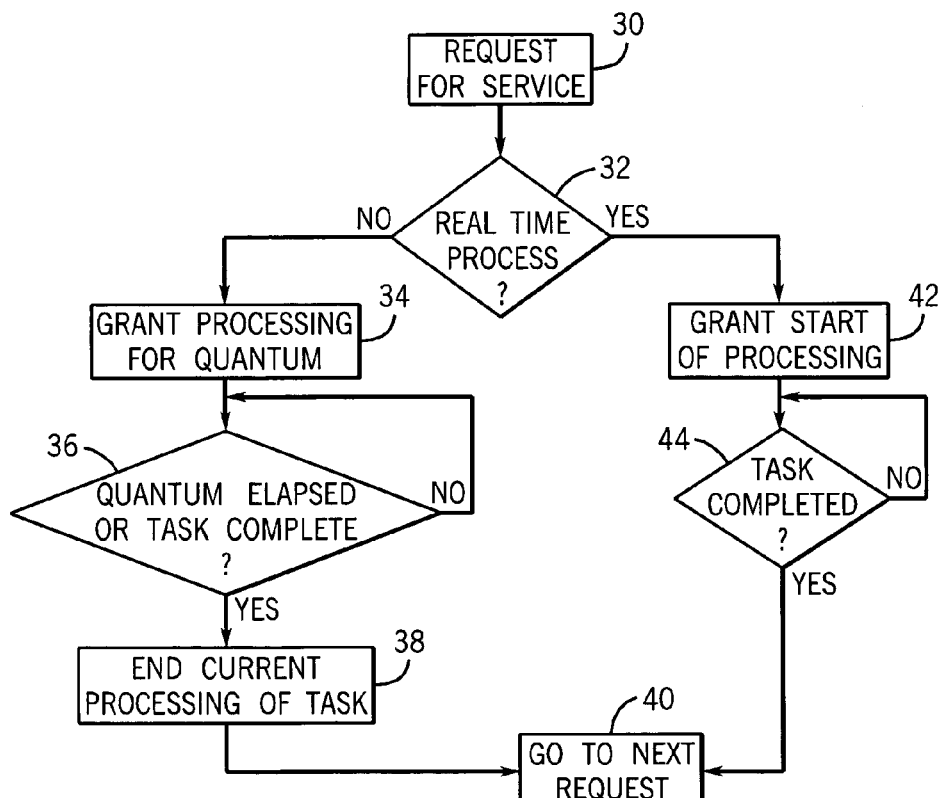
FIG. 2 illustrates an exemplary flow diagram of steps known in the art for servicing a request in a computer system.

Step 80 represents a microprocessor that is processing a plurality of tasks. In step 82 new task requests are monitored, i.e. the presence of a request to be presented to the microprocessor to initiate a new task such as loading an executable program is detected. For example, this may comprise monitoring for specific types of system calls associated with the loading of an executable program in the UNIX disk based operating system. This invention can best be implemented by interposing the UNIX init call immediately prior to init calling Static Constructors. This invention can also be interposed on the command to map a new range of memory sometimes called mmap to handle startup loading or later dynamic creation or mapping of large memory blocks. In step 84 a determination is made of whether a new task has been requested. A NO determination by step 84 results in processing returning to the beginning of step 82. A YES determination by step 84 means that a new task has been requested and results in step 86 making a determination of whether the type of task requires load management. For example, a load request of an executable program in a real-time environment would be one type of request requiring load management. Also, a request to load certain non-real-time executable programs may require load management where such programs have a large memory footprint and are loaded from remote disks accessed via an external network as shown in FIG. 1 via network 18 from disk 25 through the help of computer 27. Even though requests from a non-real-time executable are run at non-real-time, low-level tasks caused by such requests, i.e. transferring data from disk to memory, executed via hardware interrupts will delay even real-time tasks. A NO determination by step 86 results in step 88 causing the normal operating system load procedure to be used in response to the request. The processing is then returned to the beginning of step 82 to await a new task being requested.

A YES determination by step 86 indicates a task has been requested that requires load management. This results in step 90 causing a pre-load library and an associated load managing function contained in a load management program to be loaded. Step 90 as discussed in greater detail with regard to FIG. 5. In step 92 a determination is made of whether the loading of the new task (executable program) is complete. A NO determination by step 92 results in control returning to step 90 to continue management of the loading. A YES determination by step 92 results in processing continuing to the input of step 82.

Figure 5:
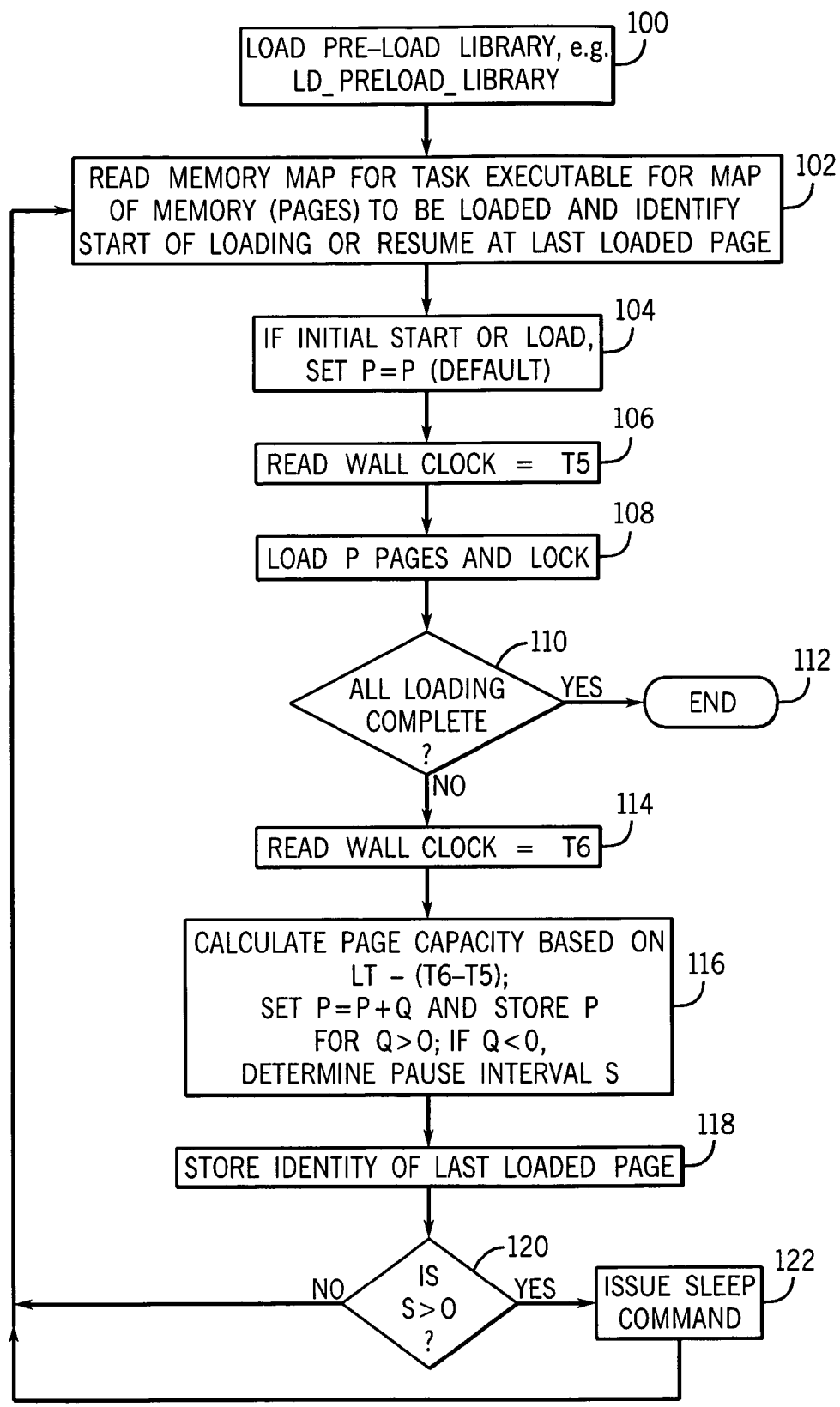
FIG. 5 is a flow diagram of an embodiment further illustrating exemplary steps for implementing step 90 as shown in FIG. 4.

FIG. 5 is a flow diagram showing exemplary steps for implementing step 90 of FIG. 4. In step 100 a pre-load library is loaded such as by using the UNIX command "LD_PRE-LOAD_LIBRARY". This action is taken at the beginning of execution of a request to run an executable program. After the executable program starts to run, this instance of the executable will be known as a process. The process of FIG. 5 interposes itself as the program starts to run. The UNIX operating system only loads a small part of the executable program into memory. Additional pieces of the program will be loaded when they are needed by the program. When each additional piece is needed, the program will be delayed while the piece is read from disk. This invention interposes itself into the startup of the executable process before initial pieces of the executable program are loaded from hard disk into RAM memory.

In step 102 the process memory map associated with the executable program that is starting up is read in order to obtain a map of memory (pages) from which the executable program is to be loaded or mapped into memory. This memory map information is provided as part of the UNIX operating system functionality. The page at which the loading is to begin is identified (the lowest memory address range in the map). During the initial startup the first set of pages (first module), the address of the page at which loading of information is to begin is also provided as part of the memory map information. The UNIX process memory map contains a table in which each row shows a beginning memory address, the amount of memory and a label identifying the type of program module to be loaded at this location. In step 104 a variable P is set to a default value, e.g. 100 pages, at the initial loading of the executable program into RAM memory. In step 106 a wall clock is read and stored as variable T5. In step 108 "P" pages of information are application page faulted from the hard disk, causing them to be stored in RAM memory at the memory address read from the memory map, and locked. A determination is made in step 110 of whether the entire executable program, i.e. the entire set of memory mapped address ranges, has been loaded. A YES determination by step 110 results in the processing terminating as indicated at END step 112.

A NO determination by step 110 results in the reading of the wall clock which is stored as variable T6. In step 116 a page capacity calculation is made based on LT−(T6−T5) where LT is the target load threshold time interval and (T6−T5) represents the time interval required to application page fault and lock the P pages into RAM memory. This is generally intended to refer to a comparison of these two time intervals and is not limited to the specific mathematical expression shown. If there is a positive value when the difference between these two time intervals is subtracted from LT representing the time to process the number of pages P, a calculation is made to determine an amount of pages Q that could be added to P for future iterations. For example, Q can be calculated using a linear interpolation. A positive value of Q indicates that additional pages can be processed during LT. For Example if (T6−T5) took less than LT, a Q value is created that is set to 10% of P. Step 116 then sets P equal to a new value: P+Q, where this new value of pages P to be processed is stored for use during the next load iteration (next module) of the subject executable program. If there is a negative value from LT−(T6−T5), it is necessary to pause the processing of pages for some amount of time S. For example S could be set equal to the absolute value of (LT−(T6−T5)) *5. To "pause" means that an operating system provided call such as sleep is used. This means that a timer is established with duration S and is entered into the operating system's timer queue. The program then voluntarily gives up the microprocessor and stops running. When the microprocessor is given up, the computer system is free to run any other of its plurality of tasks. When the timer expires, the program starts running again. In step 118 the identity of the last processed page is stored in memory and is used by step 102 during the next iteration to assist in determining the next page to be processed prior to issuing the sleep. A determination is made is step 120 of whether S>0, i.e. if a pause is to be executed. A NO determination at step 120 causes processing to return to step 102 for processing of more modules. A YES determination at step 120 results in a sleep (pause) command to be issued in step 122. Following the sleep interval in which the microprocessor works on other tasks, processing resumes at step 102 for processing of more modules.

Although embodiments of the invention have been described above and shown in the drawings, various changes, additions and deletions can be made by those skilled in the art without departing from the spirit of the invention. For example, techniques other than wall clock time measurements are known for determining a time interval. It may be desirable to utilize the subject modular program loading technique for non-real-time program loading requests such as where an exceptionally large program is to be loaded or where other tasks are being processed that place constraints on the maximum time that can elapse before the resumption of such processing. RAM is intended to include all types of memory from which a microprocessor can directly execute programs. Hard disk and disk include all forms of information storage from which information must be first transferred to RAM before a microprocessor can execute it. Although the illustrative embodiment is explained in a computer system using a UNIX disk based operating system, those skilled in the art will appreciate that other disk based operating systems could also benefit. The scope of the present invention is defined by the following claims.

I claim:

1. A method for controlling the loading of a program in a computer system using a disk based operating system where the disk based operating system includes a built-in loading program to control the loading of programs stored on a disk of a computer system, the method comprising the steps of:
   monitoring for requests to load at least certain programs stored on the disk into random access memory (RAM), wherein the at least certain programs comprise: a load request of an executable program which requires load management;
   determining that such a request is being made to load an associated certain program prior to the beginning of loading of the associated certain program by the built-in loading program of the disk based operating system and based on said determining, deciding not to execute the loading of the associated certain program by the built-in program of the disk operating system;
   loading a first loading program from a pre-load library upon the request monitoring step determining that a request to load at least a certain program has been made;
   managing, implemented by the first loading program, the loading so that the associated certain program is loaded as modules where each module has a predefined target time interval within which the loading of the module is to be completed, each module being less than the entire associated certain program;
   wherein the first loading program manages the loading of the associated certain program based on a service request that the loading of each of the associated certain program modules be completed without interruption due to servicing of other tasks in a real-time environment;
   the first loading program manages the loading of the modules by releasing the computer system to process other tasks following completion of the loading of one module and before the start of loading of a following module, whereby disruptions to the processing of the other tasks running on the computer system are minimized.

2. The method of claim 1 further comprising the steps of:
   monitoring for the completion of loading of the last module of the associated program;
   upon the last module having been loaded, the first loading program releases management of the loading of the associated certain program.

3. The method of claim 1 wherein the step of determining that the request is being made comprises monitoring for at least a first predetermined system call for processing services.

4. The method of claim 1 wherein the disk based operating system comprises a disk based UNIX operating system and the step of loading the first loading program comprises generating a system initialization call to load the first loading program from the pre-load library and run the first loading program prior to running of the built-in loading program.

5. The method of claim 1 wherein the managing of the loading of the associated certain program as modules comprises reading a memory map associated with the certain program to be loaded, the information including a map of where segments of the certain program are to be loaded into RAM memory.

6. The method of claim 5 wherein the map also identifies the amount of RAM memory required for each segment.

7. The method of claim 5 wherein the disk based operating system comprises a disk based UNIX operating system.

8. The method of claim 1 further comprising the steps of reading a first clock time prior to beginning of the loading of each module, reading a second clock time following completion of loading of each module, and determining a modular time interval for each module based on the difference between the first and second clock times.

9. The method of claim 8 further comprising the step of comparing the modular time interval associated with the loading of each module to the predefined target time interval.

10. The method of claim 9 further comprising the step of determining the size of a next module to be loaded where the size is measured as the amount of RAM memory required by the next module, the step of determining the size being based on at least a previously determined modular time interval as compared with the predefined target time interval.

11. The method of claim 10 wherein the step of determining the size is based on the size of the module preceding the next module that is increased or decreased based on a mathematical interpolation of the difference between the modular time interval of the module preceding the next module as compared with the predefined target time interval.

12. The method of claim 5 wherein the managing of the loading of the associated certain program as modules further comprises storing a marker in memory from which the beginning of the next module to be loaded can be determined.

13. The method of claim 1 further comprising the steps of running a series of tests in which information stored on the disk is read and written to RAM memory, and measuring the time required to run each test, the predefined target time interval being based on the measured times required to run the tests, whereby actual tests of reading and writing information are run on the computing system in order to obtain realistic times associated with the reading and writing information.

14. An article, comprising:
   one or more computer-readable medium;
   means in the one or more medium for monitoring for requests to load at least certain programs stored on the disk into random access memory (RAM), wherein the at least certain programs comprise: a load request of an executable program which requires load management has been inserted;
   means in the one or more medium for determining that such a request is being made to load an associated certain program prior to the beginning of loading of the associated certain program by a built-in loading program of the disk based operating system and based on said determining, deciding not to execute the loading of the associated certain program by the built-in program of the disk operating system;
   means in the one or more medium for loading a first loading program means from a pre-load library upon the request monitoring step determining that a request to load at least a certain program has been made;
   the first loading program means in the one or more medium for managing, the loading so that the associated certain program is loaded as modules where each module has a predefined target time interval within which the loading of the module is to be completed, each module being less than the entire associated certain program;

wherein the first loading program means manages the loading of the associated certain program based on a service request that the loading of each of the associated certain program modules be completed without interruption due to servicing of other tasks in a real-time environment;

a first program loading means in the one or more medium manages the loading of the modules by releasing the computer system to process other tasks following completion of the loading of one module and before the start of loading of a following module, whereby disruptions to the processing of the other tasks running on the computer system are minimized.

15. A computer system using a disk based operating system where the disk based operating system includes a built-in loading program to control the loading of programs stored on a hard disk of a computer system, the computer system comprising:

means for monitoring for requests to load at least certain programs stored on the disk into random access memory (RAM), wherein the at least certain programs comprise: a load request of an executable program which requires load management;

means for determining that such a request is being made to load an associated certain program prior to the beginning of loading of the associated certain program by the built-in loading program of the disk based operating system and based on said determining, deciding not to execute the loading of the associated certain program by the built-in program of the disk operating system;

means for loading a first loading program means from a pre-load library upon the request monitoring step determining that a request to load at least a certain program has been made;

the first loading program means for managing the loading so that the associated certain program is loaded as modules where each module has a predefined target time interval within which the loading of the module is to be completed, each module being less than the entire associated certain program;

wherein the first loading program means manages the loading of the associated certain program based on a service request that the loading of each of the associated certain program modules be completed without interruption due to servicing of other tasks in a real-time environment;

means for executing the first loading program means;

the first loading program means manages the loading of the modules by releasing a microprocessor of the computer system to process other tasks following completion of the loading of one module and before the start of loading of a following module, whereby disruptions to the processing of the other tasks running on the computer system are minimized.

16. The computer system of claim 15 wherein the disk based operating system comprises a disk based UNIX operating system, and the computer system further comprises means for generating a system initialization call to load the first loading program from the pre-load library and run the first loading program.

17. The computer system of claim 15 wherein the running means reads header information associated with the certain program to be loaded, the header information including a map of where segments of the certain program are to be loaded into RAM memory, the map also identifying the amount of RAM memory required for each segment, wherein the disk based operating system comprises a disk based UNIX operating system.

18. The computer system of claim 15 further comprising means for reading a first clock time prior to beginning of the loading of each module, means for reading a second clock time following completion of loading of each module, means for determining a modular time interval for each module based on the difference between the first and second clock times, means for comparing the modular time interval associated with the loading of each module to the predefined target time interval, and means for determining the size of a next module to be loaded where the size is measured as the amount of RAM memory required by the next module, the means for determining the size determining the size based on a previously determined modular time interval as compared with the predefined target time interval, the means for determining the size determines the size of a current module base on the size of the preceding module and increases or decreases the size of the preceding module based on a mathematical interpolation of the difference between the modular time interval of the preceding module as compared with the predefined target time interval.

19. The computer system of claim 15 further comprising means for running a series of tests in which information stored on the disk is read and written to RAM memory, and means for measuring the time required to run each test, the predefined target time interval being based on the measured times required to run the tests, whereby actual tests of reading and writing information are run on the computing system in order to obtain realistic times associated with the reading and writing information.

* * * * *